US012531875B2

(12) United States Patent
Ponsini et al.

(10) Patent No.: US 12,531,875 B2
(45) Date of Patent: Jan. 20, 2026

(54) ACCESS CONTROL SYSTEMS AND METHODS FOR LOGICAL SECURE ELEMENTS RUNNING ON THE SAME SECURE HARDWARE

(71) Applicant: Oracle International Corporation, Redwood Shores, CA (US)

(72) Inventors: Nicolas Michel Raphaël Ponsini, Mougins (FR); Patrick Van Haver, La Cadiere d'Azur (FR); Sebastian Jürgen Hans, Berlin (DE)

(73) Assignee: Oracle International Corporation, Redwood Shores, CA (US)

( * ) Notice: Subject to any disclaimer, the term of this patent is extended or adjusted under 35 U.S.C. 154(b) by 264 days.

(21) Appl. No.: 17/949,163

(22) Filed: Sep. 20, 2022

(65) Prior Publication Data
US 2024/0098095 A1  Mar. 21, 2024

(51) Int. Cl.
H04L 9/40  (2022.01)
(52) U.S. Cl.
CPC ........ *H04L 63/107* (2013.01); *H04L 63/1416* (2013.01)
(58) Field of Classification Search
CPC .......................... H04L 63/107; H04L 63/1416
See application file for complete search history.

(56) References Cited

U.S. PATENT DOCUMENTS 6,510,516 B1   1/2003   Benson et al.
8,069,469 B1 * 11/2011   Atieh ................. H04L 63/0227
                                                                 726/2
8,196,131 B1   6/2012   Von et al.
9,189,634 B2 * 11/2015   Lin ....................... H04L 63/102
(Continued)

FOREIGN PATENT DOCUMENTS

CN       105404794 A       3/2016
EP          3291084 A1      3/2018
WO     2018/042016 A1      3/2018

OTHER PUBLICATIONS

Anonymous et al: "The CAP File Format", Retrieved from http://pfa12.free.fr/doc_java/javacard_specifications/specs/jcvm/html/JCVM06cap.html#53140, Retrieved on Apr. 25, 2024, pp. 1-41.
(Continued)

*Primary Examiner* — Ghodrat Jamshidi
(74) *Attorney, Agent, or Firm* — Invoke

(57) ABSTRACT

Techniques are described herein for applying access controls to logical secure elements (LSEs) running on the same secure element hardware platform. Embodiments include a firmware component that determines whether a message targeting an LSE is authorized to trigger an operation. For example, the firmware component may verify a signature of the received message using a public key, shared secret, or other access control key. Additionally or alternatively, access control policies may be defined to constrain the load of the LSEs on the SE platform hardware and/or to prioritize LSE access. For example, the access control policies may define usage thresholds, such as maximum threshold memory and/or processor utilization rates. As another example, the access controls may restrict the active time for an LSE to a threshold duration. If access constraints are violated or the message cannot be verified, then the firmware component may delay or deny the operation.

23 Claims, 8 Drawing Sheets

(56) References Cited

U.S. PATENT DOCUMENTS

| | | | |
|---|---|---|---|
| 9,426,543 B1 | 8/2016 | Li et al. | |
| 10,013,662 B2* | 7/2018 | Brandwine | G06Q 30/06 |
| 10,645,665 B2* | 5/2020 | Shah | H04W 8/12 |
| 11,115,284 B1* | 9/2021 | Paiva | H04L 41/082 |
| 11,729,292 B1 | 8/2023 | Hyndman | |
| 2001/0047444 A1* | 11/2001 | Waldie | G06F 13/364 |
| | | | 710/124 |
| 2004/0107222 A1 | 6/2004 | Venkatesh et al. | |
| 2004/0143820 A1 | 7/2004 | Jong | |
| 2004/0193759 A1 | 9/2004 | Scott et al. | |
| 2006/0004895 A1 | 1/2006 | Kim | |
| 2007/0169043 A1 | 7/2007 | Violleau et al. | |
| 2012/0108200 A1* | 5/2012 | Rubin | H04W 28/10 |
| | | | 455/509 |
| 2012/0108206 A1* | 5/2012 | Haggerty | H04L 63/0853 |
| | | | 455/411 |
| 2012/0327912 A1* | 12/2012 | Kirveskoski | H04W 76/15 |
| | | | 455/434 |
| 2013/0024700 A1 | 1/2013 | Peterson et al. | |
| 2014/0073375 A1* | 3/2014 | Li | H04W 12/069 |
| | | | 455/558 |
| 2014/0379987 A1* | 12/2014 | Aggarwal | G06F 12/0215 |
| | | | 711/133 |
| 2016/0014154 A1* | 1/2016 | Huang | H04L 63/20 |
| | | | 726/1 |
| 2018/0032734 A1* | 2/2018 | Gunti | G06F 21/575 |
| 2019/0286577 A1* | 9/2019 | Leitao | G06F 9/544 |
| 2020/0043123 A1* | 2/2020 | Dash | G06F 9/3851 |
| 2020/0201669 A1* | 6/2020 | Hwang | G06F 12/0246 |
| 2020/0356468 A1 | 11/2020 | Fugate et al. | |
| 2021/0243715 A1* | 8/2021 | Matolia | H04W 48/02 |
| 2021/0318812 A1* | 10/2021 | Lidman | G06F 3/0622 |
| 2021/0350011 A1* | 11/2021 | Ashlock | G06N 20/00 |
| 2022/0124481 A1* | 4/2022 | Kang | H04W 12/40 |
| 2022/0191251 A1 | 6/2022 | Gavish et al. | |
| 2023/0047213 A1* | 2/2023 | Chen | H04W 76/27 |
| 2023/0054424 A1* | 2/2023 | Bamdhamravuri | |
| | | | G06F 12/0891 |
| 2023/0308855 A1* | 9/2023 | Matolia | H04W 4/50 |
| 2023/0308861 A1* | 9/2023 | Fan | H04W 12/45 |

OTHER PUBLICATIONS

Tip et al., "Practical experience with an application extractor for Java", ACM SIGPLAN Notices, vol. 34, No. 10, 1999, pp. 292-305.

"Baseline Security Recommendations for IoT", Retrieved at https://www.enisa.europa.eu/publications/baseline-security-recommendations-for-iot, Nov. 20, 2017, 3 Pages.

"MIPI I3C and I3C Basic", Retrieved at https://www.mipi.org/specifications/i3c-sensor-specification, Retrieved on May 2022, 8 Pages.

"NIST Releases Draft Guidance on Internet of Things Device Cybersecurity", Retrieved at https://www.nist.gov/news-events/news/2020/12/nist-releases-draft-guidance-internet-things-device-cybersecurity, Retrieved on May 2022, 3 Pages.

* cited by examiner

ACCESS CONTROL SYSTEMS AND METHODS FOR LOGICAL SECURE ELEMENTS RUNNING ON THE SAME SECURE HARDWARE

TECHNICAL FIELD

The present disclosure relates, generally, to secure hardware design and implementations. In particular, the present disclosure relates to isolating and switching between multiple logical secure elements running on the same secure hardware.

BACKGROUND

Mobile phones and other devices often include secure elements, such as Subscriber Identity Module (SIM) cards and other forms of smart cards, to provide strong protection against unauthorized access of sensitive data. A secure element generally comprises a secure chip and dedicated software, which may be used for a variety of applications including payment processing, biometric authentication, and mobile network communications. In many cases, both the chip and software of a secure element are packaged as a single product and distributed by a Security Service Provider (SSP).

Many mobile device users wish to use secure elements from different SSPs to access different secure applications and services. One approach to accommodate such users is for mobile devices to include slots that allow users to physically remove a secure element chip from the mobile device and insert another secure element chip from a different SSP. For example, mobile phones may include card slots that allow users to quickly swap between different SIM cards. However, physically swapping between different secure elements is generally inconvenient for the end user, especially if the user changes services frequently. There is also a risk of misplacing and losing the card that is not currently in use.

In some cases, mobile devices may include multiple embedded secure elements and/or expansion slots. SIM card manufacturers and Mobile Network Operators (MNOs) have developed standards for embedded SIM (eSIM) cards and embedded universal integrated circuit cards (eUICCs). These standards define use, format, functionality, and associated profiles for the eSIM/eUICC. These components, when integrated into a mobile handset, provide an interface for receiving and responding to network and handset requests. In addition, handset manufacturers may include at least one (and often multiple) physical expansion slots for using multiple removable SIM/UICCs. Integrating more than one physical slot for a SIM card is a large cost factor for mobile device manufacturers, whether it is an expansion slot or an embedded physical slot. Each additional slot increases the footprint of the secure element hardware, consuming precious real estate within the mobile device's printed circuit board (PCB) and adding to the complexity of the hardware design.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
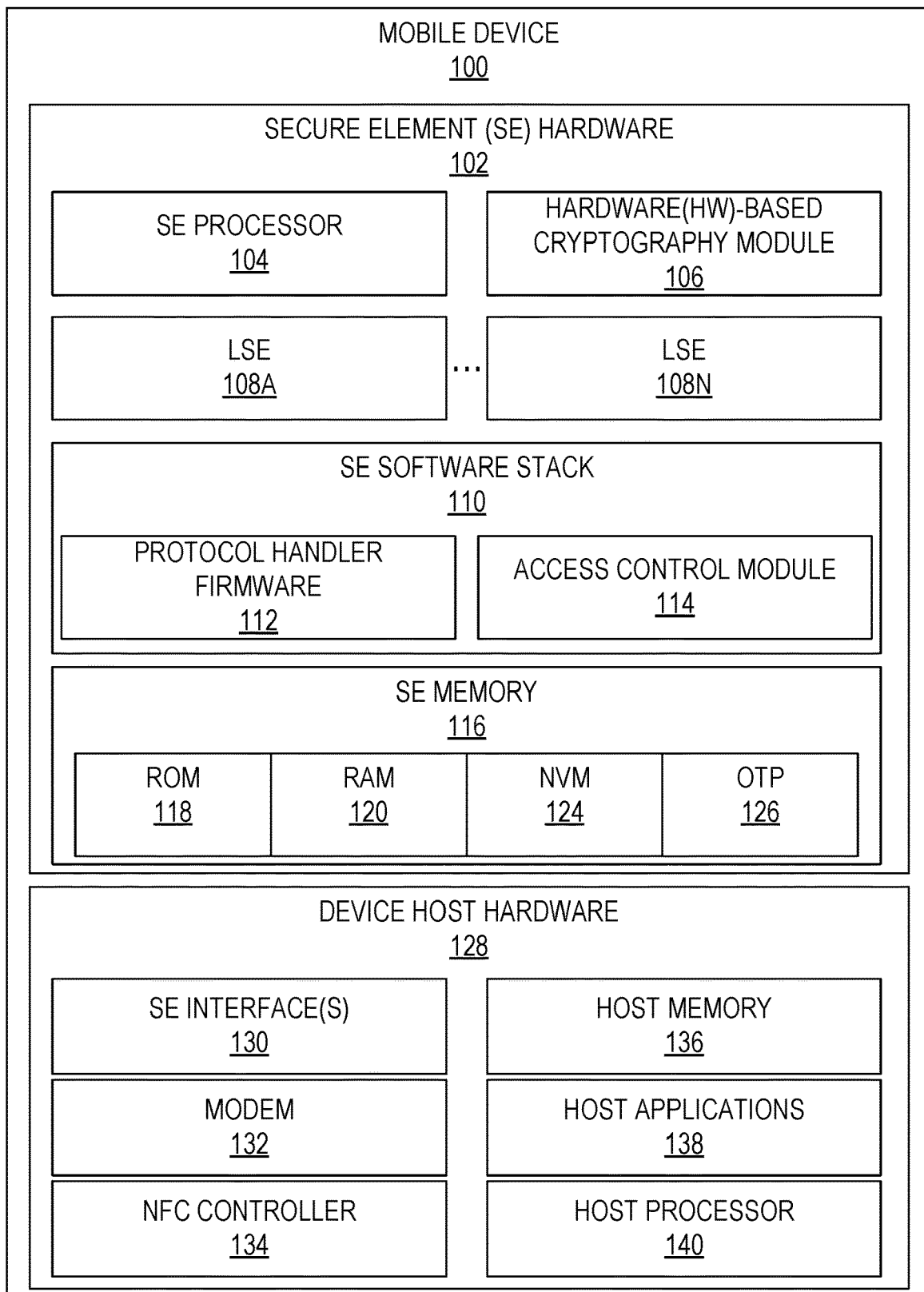
FIG. 1 illustrates an example system architecture of a mobile device in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. One or more operations illustrated in the figures and described herein may be modified, rearranged, or omitted all together. Accordingly, the particular sequence of operations illustrated in the figures and examples should not be construed as limiting the scope of one or more embodiments.

1. General Overview

Techniques are described herein for running multiple logical secure elements (LSEs) on the same physical secure element (SE) hardware. For example, embodiments may include running multiple logical Subscriber Identification Modules (SIM) cards on the same physical SIM card or universal integrated circuit card (UICC). Additionally or alternatively, embodiments may include running other secure element applications and services on the same SE hardware. The techniques allow for mobile devices users to access multiple security services, which may originate from different security service providers (SSPs), in a secure manner using the same SE hardware without requiring the integration of multiple physical slots on a mobile device or the physical exchange of different cards within the same slot. Thus, the footprint and cost of secure element hardware within a mobile device may be significantly reduced while maintaining or increasing the number of security services accessible to a mobile device user.

The virtualization of multiple secure elements on a single SE hardware platform is complicated by several factors. SE hardware platforms often have limited hardware capabilities relative to the main mobile processor in modern smartphones and central processing units (CPUs) in portable computers. For example, SE hardware platforms often lack or have a downscale version of a memory management unit (MMU). In addition, SE hardware platforms often include much slower processors to minimize power consumption and manufacturing expenses and may not be able to execute dedicated instructions from the CPU's instruction set architecture (ISA) that rely on large and scalable resources. Therefore, deploying virtualization solutions such as hypervisors is generally not feasible on SE hardware platforms. Such virtualization solutions may also fail to maintain a sufficient security certification level that is expected of a SE hardware platform.

Embodiments herein include a firmware component that executes on an SE hardware platform to efficiently route messages from a device host to a targeted LSE. The firmware component may process messages in a manner that enforces security and certification levels of multiple LSEs running on the same SE hardware platform without requiring the integration of more powerful hardware, such as full-scale MMUs and high-performance processors. Thus, the costs and power-consumption of the SE hardware within a mobile device may be minimized.

In some embodiments, the firmware component accesses an LSE mapping table when routing messages to targeted LSEs. The LSE mapping table may store, for each respective LSE, an identifier and a mapping to hardware resources within the SE hardware platform to which the respective LSE has access. For example, the LSE mapping table may include a mapping to memory segments where code and data specific to an LSE are stored. When a message is received that targets an LSE, the firmware may reconfigure a switch register (SR) with a reference to the entry to use in the LSE mapping table. The SE software stack code (SESS-code) may then be executed using the entry specified by the SR to retrieve, from the LSE mapping table, the address of resources to which the SESS-Code has access for processing the message. The SESS-code may be shared across LSEs, allowing the SE hardware to reuse the same SE software stack to efficiently run multiple LSEs.

Although the SESS-code may be common to multiple LSEs, the SESS data that is mapped to a given LSE may be unique. The SESS data may include application code and configurations that affect the runtime behavior of an LSE, which may also be unique per LSE. For instance, one LSE may host a network access application and another LSE may run Java Card applications. Additionally or alternatively, LSEs may run and host other secure applications, which may vary depending on the type of security service and/or the SSP associated with the application.

The SE hardware platform may enforce security constraints on the hardware to maintain confidentiality and integrity isolation between the LSEs running on the same hardware platform. In some embodiments, the mapping table includes a set of cryptographic keys used to encrypt and decrypt content stored or read from memories associated to the LSE. A cryptographic key for an LSE may be derived based on one or more master keys stored by the SE hardware, an identifier associated with the LSE, a type of memory storing encrypted data for the LSE, and/or other LSE attributes.

In some embodiments, the firmware component implements access controls that restrict which entities may access a given LSE. When an inbound message attempts to switch to or otherwise access an LSE, the firmware component may determine whether the message is authorized to trigger the requested operation. For example, the firmware component may verify a signature of the received message using a public key or shared secret. If the message is successfully verified, then the firmware protocol may trigger the switch and/or other requested operation. Otherwise, the firmware component may deny the operation.

Additionally or alternatively, access control policies may restrict the behavior of LSEs running on SE hardware. In some embodiments, access control policies may constrain the load of the LSEs on the SE platform hardware and/or prioritize LSE access. For example, the access controls may define usage thresholds associated with a given LSE, such as maximum threshold memory, processor, and/or peripheral utilization rates. As another example, the access controls may restrict the active time for an LSE to a threshold duration. Access controls may be applied individually or to groups of LSEs. In the latter scenario, LSEs may be grouped by common attributes including the type of SE application(s) and/or SSP associated with the LSE.

One or more embodiments described in this Specification and/or recited in the claims may not be included in this General Overview section.

2. System Architecture

FIG. 1 illustrates an example system architecture of a mobile device in accordance with some embodiments. As illustrated in FIG. 1, the system architecture of mobile device 100 includes secure element (SE) hardware 102 and device host hardware 128. SE hardware 100 includes SE processor 104, hardware (HW)-based cryptography module 106, logical secure elements (LSEs) 108a-n, SE software stack 110, and SE memory 116. Device host hardware 128 includes SE interface 130, modem 132, near-field communication (NFC) controller 134, host memory 136, and host processor 140. Device host hardware may run host applications 138. A mobile device may include more or fewer components than the components illustrated in FIG. 1, depending on the particular device architecture.

In some embodiments, mobile device 100 is a mobile handset, such as a smartphone, configured to connect to one or more data communication networks, which may include wired and/or wireless data communication networks. Example data communication networks include Global Systems for Mobile (GSM), Code Division Multiple Access (CDMA), Universal Mobile Telecommunication System (UMTS), Long Term Evolution (LTE), General Packet Radio Service (GPRS), Universal Mobile Telecommunications System (UMTS), Broadband Global Area Network (BGAN), wireless local area network (WLAN), Ethernet, etc. In other embodiments, mobile device 100 may be a different device. For instance, mobile device 100 may be a tablet, laptop, or desktop computer. As another example, mobile device 100 may be a complex smart card, such as a credit card or identity (ID) card with an embedded secure element. As another example, mobile device 100 may be a complex system such as a connected automobile with an embedded secure element used for (a) connectivity, (b) vehicle-to-vehicle and/or vehicle-to-infrastructure monitoring, and/or (c) maintenance and/or service subscriptions.

In some embodiments, SE hardware 100 is a microprocessor-based chip that includes hardware components for protecting secure data from unauthorized access and running secure applications. SE hardware 100 may comprise a smart card, such as a universal integrated circuit card (UICC), which is a smart card that conforms to the specifications defined by the European Telecommunications Standards Institute ETSI Smart Card Platform project. A subscriber identification module (SIM) card is an example of a UICC. Additionally or alternatively, SE hardware 100 may include other types of integrated circuit cards (ICCs) and tamper-resistant security chips for controlling access to secure resources.

In some embodiments, SE processor 104 is a microprocessor for executing an SE platform runtime environment and SE applications. An example SE platform runtime environment is Java Card Runtime Environment (JCRE). The JCRE provides a lightweight version of the Java Runtime Environment (JRE) that is tailored for smart cards and other tamper-resistant security chips to allow these SE hardware platforms to host SE applications employing Java technology.

A hosted SE application within the JCRE may be referred to as a Java Card applet. The JCRE includes a firewall mechanism that isolates different applets on the smart card and a sharing mechanism that allows applets to explicitly make objects available to other applets. The JCRE further includes a Java Card Virtual Machine (JCVM) that runs bytecode, which is generated using a different encoding schema than the full JRE. Generally, the encoding schema of the JCRE reduces the memory footprint of an application to optimize for the application for execution by SE hardware 102, which generally includes much more constraints than host hardware 128. For example, the size of SE memory 116 may be much smaller than host memory 136 and the speed of SE processor 104 may be much slower than host processor 140. Further, the native instruction set architecture (ISA) of SE processor 104 may be smaller or otherwise different than the ISA of host processor 140. One optimization technique to account for the constraints is to divide an application's code into packages below a size threshold and to restrict the packages that programming language constructs that are available within the environment. Although some examples described herein relate to the JCRE, embodiments described herein may be implemented by other runtime environments that execute on smart cards and other tamper-resistant chips.

SE hardware 102 may include HW-based cryptography module 106 for encrypting and decrypting data stored by the secure element. In some embodiments, HW-based cryptography modules 106 is implemented as part of the instruction set of SE processor 104, allowing the processor to encrypt and decrypt data without relying on software algorithms to perform the encryption. In other embodiments, HW-based cryptography module 106 may be external from the processor. For example, HW-based cryptography 106 may be an advanced encryption standard (AES) chip or cryptographic accelerator residing on a bus between SE processor 104 and SE memory 116.

SE hardware 102 runs multiple LSEs 108a-n, which may operate as if multiple secure element chips have been installed within mobile device 100 from the perspective of a mobile device user. For example, LSEs 108a-n may operate as if multiple embedded and/or removable SIM cards were currently operating within mobile device 100. Thus, LSEs 108a-n may correspond to virtual SIM cards and/or other tamper-resistant chips that share and are run from the same SE hardware components. SE hardware 102 and/or firmware running therein may enforce isolation between different LSEs to prevent one LSE from accessing the applets and code of another LSE. The isolation mechanism may be separate and distinct from the firewall mechanism of the JCRE previously mentioned. The firewall mechanism may be applied to a given LSE to maintain separation between different applets that are installed on the same LSE. The isolation mechanism may be implemented at a lower level to maintain isolation between different LSEs, each of which may be configured with their own firewalls.

SE software stack (SESS) 110 comprises a set of components used to execute SE applications. SESS 110 may include code, referred to herein as SESS-code, that executes applets and provides a runtime environment for the applets. In some embodiments, SESS 110 comprises protocol handler firmware 112 and access control module 114. Additionally or alternatively, SESS 110 may include other components, such as a JCVM, the Java Card API (JCAPI) code and/or other components of the JCRE for hosting Java Card applications. In some embodiments, the SESS-code is distinct from the code of applets and LSE applications. SESS-code provides a program and runtime environment for executing the LSE application code. For instance, the SESS-code may provide a virtual machine that runs LSE applets. Additionally or alternatively, the SESS-code may manage access to the SE hardware components, such as crypto accelerators and memory segments, and/or perform memory management operations including allocating runtime memory for an applet that is currently running within the runtime environment. The SESS-code may be common to LSEs 108a-n to optimize for size and reduce processing overhead.

In some embodiments, protocol handler firmware 112 is low-level firmware that is used by SESS-code to manage operations targeting LSEs 108a-n. In the case of a Java Card based secure element, protocol handler firmware 112 may be part of the JCRE. However, the firmware may be integrated into other runtime environments or in a standalone manner, depending on the particular implementation.

In some embodiments, protocol handler firmware 112 manages routing messages received from device host hardware 128 to the targeted LSE. When routing messages, protocol handler firmware 112 may trigger a switch operation to change which LSE is currently active and running on SE hardware 102. As described further below, the switch operation may comprise reassigning a global address in a switch register. A switch operation may be performed through a re-configuration of the SESS-code, without requiring substantial modifications.

Access control module 114 provides authentication to prevent unauthorized entities from triggering changes between LSEs and/or other operations that access LSE data. Access control module 114 may be a component of protocol handler firmware 112 or may be a separate component, depending on the particular implementation. Access control module 114 may block requested operations if the message is not successfully verified as having originated from an entity authorized to trigger the requested operation.

In some embodiments, SE memory 116 securely stores data for LSEs 108a-n. SE memory 116 may include one or more types of volatile and/or non-volatile storage such as read-only memory (ROM) 118, random-access memory (RAM) 120, non-volatile memory (NVM) 124, and one-time programmable (OTP) memory 126. SE memory 116 may store the data in an encrypted format. As described further below, the encryption scheme, such as the encryption algorithm and/or key location, may vary between different LSEs to provide data integrity and isolation.

In some embodiments, switch commands and other messages originate from device host hardware 128. For example, messages may be received wirelessly through modem 132 and/or NFC controller 134. The messages may be routed to SE hardware 102 by SE interface 130. SE interface 130 may convert the messages received wirelessly to a format that is consumable by protocol handler firmware 112. Additionally or alternatively, SE interface may include a bus or other communication system for transferring messages from device host hardware 128 to SE hardware 102.

In some embodiments, modem 132 is a mobile broadband modem that sends and receives messages via a mobile broadband connection. For example, carriers, including mobile network operators (MNOs) and mobile virtual network operators (MVNOs), may send network messages to mobile phone 100 wirelessly through modem 132 via a cellular network. Different LSEs may be targeted based on which mobile phone operator sent the message. SE hardware 100 may support multiple virtual SIM cards from different mobile phone operators. Additionally or alternatively, other messages received wirelessly through modem 132 may target different types of LSEs. Example LSE applications may include payment processing, biometric authentication, identity management, and mobile network communications.

In some embodiments, NFC controller 134 receives near-field wireless messages from external devices. NFC communications may transmit data through inductive coupling between an antenna in NFC controller 134 and the external device when placed within a threshold distance. An NFC message may trigger an operation in an LSE. For example, a payment terminal may generate an NFC message to extract credit card information and/or other data during a transaction. The target LSE may securely store financial information of a mobile device user and include one or more applets for processing secure transactions initiated with a payment terminal. NFC messages may trigger other operations, which may vary depending on the type of LSE application and SSP associated with the application.

Additionally or alternatively, device host hardware 128 may include other components for receiving messages through wired or wireless interfaces. For example, device host hardware 128 may include a Bluetooth module, a Zigbee chip, a Wi-Fi card, an infrared receiver, a universal serial bus (USB) controller, and/or a serial communications interface. Messages received through such hardware components may serve as external triggers that initiate operations to switch between LSEs 108*a-n* and access resources that have been mapped to the LSE.

Device host hardware 128 further includes host memory 136 and host processor 140 for executing host applications 138. For example, a smartphone may include a mobile processor and RAM for executing a mobile operating system and mobile phone applications. Processor 140 and host memory 136 may be physically separate from SE hardware 102 to protect against attacks if the security of mobile device 100 is compromised. SE hardware 102 may prevent processor 140 from accessing secure data stored in SE memory 116. Requests to access the data may be routed through protocol handler firmware 112.

In other embodiments, device host hardware 128 may include additional or fewer components. For example, some devices, such as smart credit cards and company badges, may not include a mobile processor, CPU, or memory external to the secure element. These devices may not execute applications other than the applets hosted by SE hardware 102. Thus, the architecture of device host hardware 128 may vary depending on the particular type of device in which SE hardware 102 is integrated.

3. Logical Secure Element Mappings and Configurations

In some embodiments, SE hardware 102 stores a mapping table that establishes unique mappings for each of LSEs 108*a-n*. The mapping for a given LSE may be used to identify attributes associated with the LSE and resources that have been bound to the LSE. For example, the mapping for the given LSE may identify the cryptographic keys, global structures, and memory segments bound to the LSE. Protocol handler firmware 112 may access the mapping table to route messages from the device host to the targeted LSE.

Figure 2:
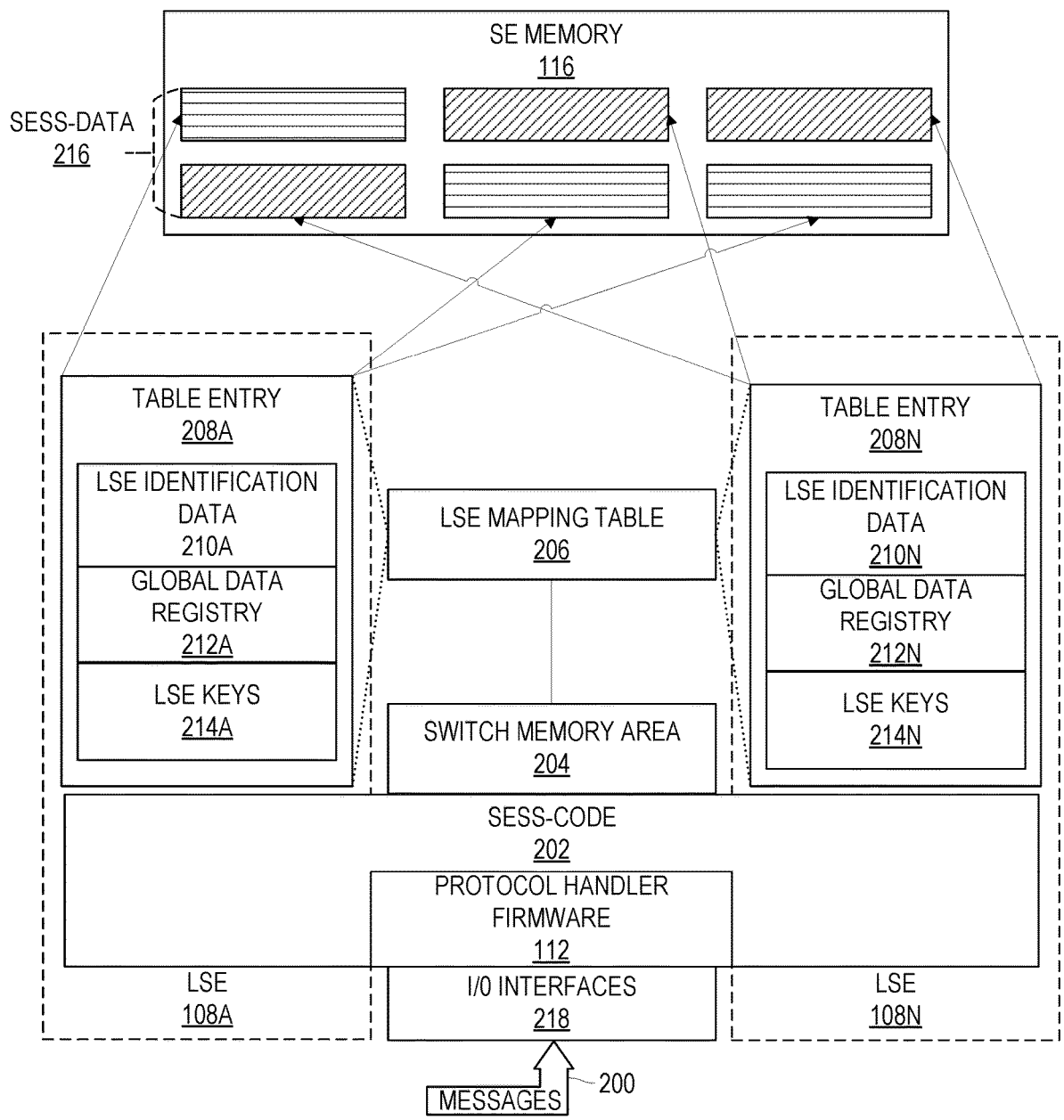
FIG. 2 illustrates an example set of logical secure element (LSE) mappings in accordance with some embodiments.

FIG. 2 illustrates an example set of LSE mappings in accordance with some embodiments. LSE mapping table 206 includes n table entries, including table entry 208*a* and table entry 208*n*, corresponding to n different LSEs. LSE mapping table 206 may be allocated from SE memory 116, such as in NVM. NVM is a type of memory that retains stored information even when power is removed. Examples of NVM include flash memory storage and electrically erasable programmable read-only memory (EEPROM).

Table entry 208*a* establishes a unique mapping for LSE 108*a* between LSE identification data 210*a*, global data registry 212*a*, and LSE keys 214*a*. Table entry 208*n* establishes a unique mapping for LSE 108*n* between LSE identification data 210*n*, global data registry 212*n*, and LSE keys 214*n*. The number of entries in the table may vary depending on the number of LSEs that have been installed on SE hardware 102. In some embodiments, the number of LSEs and corresponding entries in the table may be capped to a maximum threshold, which may be selected based on available hardware resources such as the size of SE memory 116.

LSE identification data 210*a-n* includes one or more identifiers for an LSE. In some embodiments, LSE identification data for a given LSE includes the following two identifier fields: (a) an ID field that is dependent on the protocol that permits the firmware component to select the given LSE, and (b) a UUID field that stores a universally unique identifier (UUID). The ID value assigned to an LSE may correspond to its position, #n, in the mapping table or may be some other value assigned by protocol handler firmware 112. For example, LSE #1 may correspond to the LSE mapped to the first entry in the mapping table, LSE #2 to the second entry, and LSE #n to the $n^{th}$ entry. On different devices, LSE #n may have the same identifier.

The UUID value is a globally unique identifier such that LSE #n does not have the same UUID on different devices. A UUID may be generated as a function of a timestamp, namespace identifiers associated with the LSE, identifiers associated with SE hardware 102, and/or other attributes associated with an LSE. For example, a UUID may be generated by applying a hash algorithm, such as a secure hash algorithm (SHA) or the message-digest algorithm 5 (MD5), to a combination of one or more attributes that are unique to the combination of the LSE and SE hardware on which it is running. However, the attributes and algorithm used to generate the UUID value may vary depending on the particular implementation.

In some embodiments, global data registries 212*a-n* corresponds to a root global structure stored in NVM that may be dereferenced by SESS-code 202 to access internal registries and states associated with an LSE. A global data registry for an LSE may define the memory boundaries and global states persistent across SE hardware 102 resets and power disruption events. The global data structure may store or refer to various data for an LSE including:

- A set of memory segment entries bound to the LSE. A memory segment entry may identify the type of memory (e.g., ROM, OTP, NVM, RAM), a memory address identifying the start location for the memory segment, and a length of the memory segment.

Personalization data that identifies user customizations and configurations associated with the LSE.

Memory management data such as stack and frame pointers, which may be dereferenced to access parameters, local variables, and other data for executing one or more LSE applets.

Application management data such a secure channel registry and an installed applications table to indicate what LSE applications (e.g., Java Card applets) are installed on the LSE.

LSE keys 214a-n are a set of unique cryptographic keys bound to the device and the LSE. The value in the table entry may include the set of keys themselves or a reference (e.g., memory type, address, and length) to access the keys. Different sets of keys may be bound to different LSEs to protect sensitive data and isolate LSEs from one another.

In some embodiments, LSE keys for a given LSE includes the following two fields (a) an encryption key field storing or referencing cryptographic keys bound to the LSE and used to encrypt and decrypt data for the LSE, and (b) an access verification key field storing or referencing a public key or shared secret used to verify entities attempting to access an LSE. Techniques for deriving and applying the keys to enforce isolation and restrict access to an LSE are described further below in Section 5, titled Isolation Enforcement, and Section 6, titled Access Control: Message Verification.

SESS-code 202 may dereference the root global structure to access SESS-data 216 that is bound to an LSE to process inbound messages 200 received via I/O interfaces 218. As previously noted, SESS-code 202 may be common to LSEs 108a-n. However, the behavior of a given LSE may be unique, based on the global data registry mapped to the LSE, the associated configurations per LSE of the SESS-code 202, and the specific applications (e.g., Java Card applets) run by the LSE.

In some embodiments, switch memory area 204 is a dedicated NVM and/or RAM memory area that hosts the address of the current mapping table entry. SESS-code 202 may read the value stored in switch memory area 204 to retrieve the current active mapping table and access the associated global data registry. Switch memory area 204 may be used to efficiently switch between LSEs as described further below in Section 4, titled Switch Handling.

Figure 3:
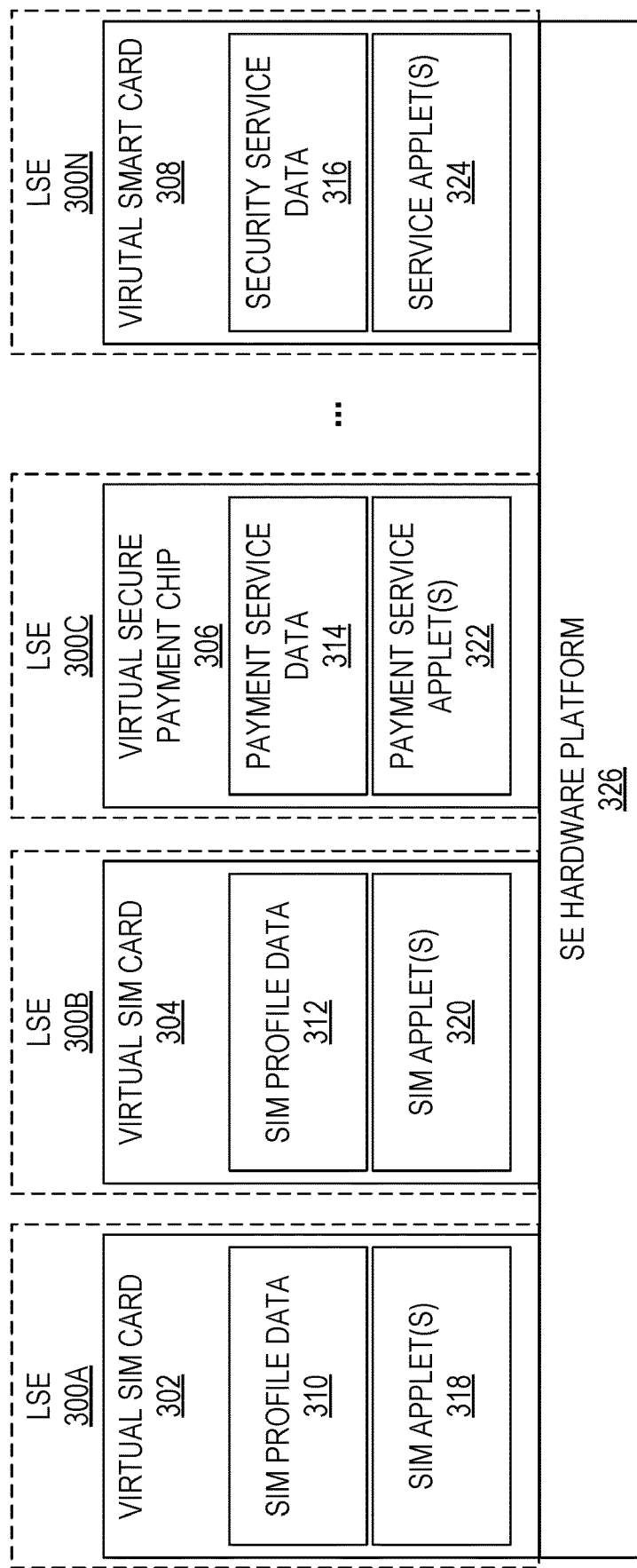
FIG. 3 illustrates an example set of LSEs running on a physical secure element (SE) in accordance with some embodiments.

FIG. 3 illustrates an example set of LSEs running on a physical secure element in accordance with some embodiments. As illustrated, LSEs 300a-n are configured as different virtual SE chips. For example, LSE 300a operates as virtual SIM card 302, and LSE 300b operates as virtual SIM card 304. Each LSE may behave as if mobile phone 100 had SIM cards from different MNOs embedded within the device or inserted into expansion slots. However, each LSE may be run from the same physical secure element, which may be a SIM card, UICC, or other type of smart card.

To operate as a virtual SIM card, LSE 300a may be mapped to SIM profile data 310 and SIM applet(s) 310, and LSE 300b may be mapped to SIM profile data 312 and SIM applet(s) 312. SIM profile data may include subscription credentials and/or other data to authenticate with an MNO and connect with a carrier network. For example, the profile data may include an International Mobile Subscriber Identity (IMSI) number and secret keys to authenticate the virtual SIM card with an MNO according to the Authentication and Key Agreement protocol. However, the authentication mechanism and profile data may vary for different mobile carrier networks and MNOs. SIM applets may execute various SIM-specific functions such as connecting to a carrier network, logging events (e.g., recent calls, call failures, etc.), and switching between available cellular networks.

With multiple virtual SIM cards, mobile device 100 may provide service from multiple MNOs without requiring the installation of multiple physical SIM cards. Mobile phone users may switch between different virtual SIM cards to connect to cellular networks, which may be advantageous when the coverage of the carrier networks vary. For example, the mobile phone may select and change carrier networks based on which network provides stronger coverage within a geographic region where the user is currently located.

Additionally or alternatively, an LSE may represent other types of virtual smart cards. For example, LSE 300c operates as virtual secure payment chip 306. LSE 300c may be mapped to payment service data 314 and payment service applet(s) 322. Payment service data 314 may include tokenized credit card information, billing address information, security codes, secret keys (e.g., token keys), and/or other information for executing a payment transaction. Payment service applet(s) 322 may execute operations associated with executing the payment transaction, such as connecting with token service providers (TSPs) to replace sensitive credit card numbers with a token key, initiating a transaction with a payment service terminal, and tracking historical transactions.

Other LSEs, including LSE 300n, may similarly operate as virtual smart cards. Each virtual smart card may be associated with security service data and one or more service applet(s), which affect the behavior of the LSE. For instance, virtual smart card 308 is associated with security service data 316 and service applet(s) 324 to execute one or more applications. Example applications may include payment processing, biometric authentication, identity management, mobile network communications, etc.

SE hardware platform 326 may be a single secure element that hosts LSE applications 300a-n. SE hardware platform 326 may include SE hardware resources 102 as depicted in FIG. 1. LSEs 300a-n may share one or more of the hardware resources, including SE processor 104, hardware-based cryptography module 106 (e.g., cryptography accelerators), and SE memory 116. Further, as previously noted, the SESS-code associated with SE software stack 110 may be common to the LSEs. Thus, the shared resources may include, fully or partly, the runtime environment (e.g., JCRE), the virtual machine (e.g., JCVM), the programming language APIs (e.g., Java API), and/or the programming language libraries. One or more of these components may be customized for a specific LSE or a subset of the LSEs. In this case, the SESS-code may include only the common part across LSEs while the custom part of the components is stored separately per LSE or per LSE group.

4. Switch Handling

In some embodiments, messages 200 may trigger a switch operation that changes which LSE is currently active on the SE hardware platform. Messages 200 may explicitly request a switch or protocol handler firmware 112 may infer a switch command from the message. For example, an operating system of a mobile phone may send an explicit command to protocol handler firmware 112 to switch SIM LSEs responsive to receiving a request to change carriers from a user. As another example, protocol handler firmware 112 may receive a message, via NFC controller 134, requesting to initiate a payment transaction with a payment security service. Protocol handler firmware 112 may infer a switch command based on the message to change the active LSE to LSE 300c.

In some embodiments, protocol handler firmware 112 manages the LSE that is currently activated on SE hardware 102. In particular, protocol handler firmware 112 may maintain and update a state identifying which LSE is currently activated and configured to receive messages. The state information may correspond to the LSEs index in mapping table 206, which may be stored in switch memory area 204. Protocol handler firmware 112 may change the state information, including the index, stored in switch memory area 204 to switch the LSE that is currently activated.

As previously noted, protocol handler firmware 112 may redirect messages 200 received via device host hardware 128 to a targeted LSE. If the received message is targeting the LSE already selected and configured to receive messages, then protocol handler firmware may forward the message to SESS-code 202 without executing a switch operation. However, if the received message is targeting another LSE, then protocol handler firmware 112 may switch the currently activated LSE before forwarding the message.

Figure 4:
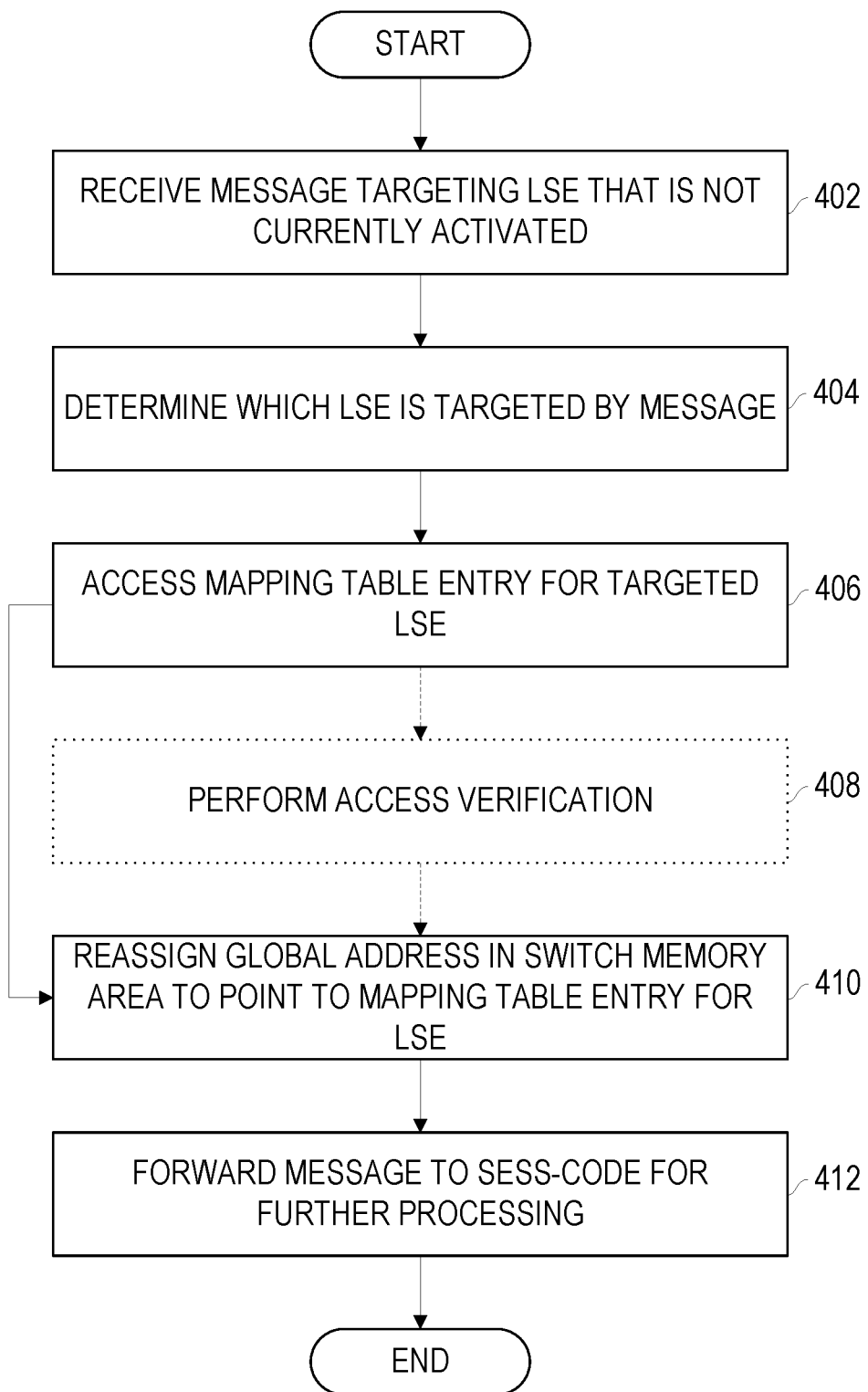
FIG. 4 illustrates an example set of operations for executing a switch operation to change the LSE that is currently activated within an SE hardware platform in accordance with some embodiments.

FIG. 4 illustrates an example set of operations for executing a switch operation to change the LSE that is currently activated within an SE hardware platform in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, in operation 402, protocol handler firmware 112 receives a message targeting an LSE that is not currently activated. Various protocols may be used to exchange messages between the device host and the SE hardware. Protocol handler firmware 112 may intercept the messages from various interfaces, such as interfaces between the SE hardware and modem 132, NFC controller 134, and host processor 140. Protocol handler firmware 112 may act as a primary handler of the I/O interfaces, interpreting the I/O signals according to one or more protocols and deducing which LSE is targeted by a message. Protocol handler firmware 112 may further filter messages from interfaces that do not target an LSE or that are not authorized to trigger operations on an LSE.

In operation 404, protocol handler firmware 112 determines which LSE is targeted by the message. In some embodiments, protocol handler firmware 112 may deduce or infer the targeted LSE based on which I/O interface the message is received. For example, I/O interfaces 218 may include an inter-integrated circuit (I$^2$C) interface and a contactless International Standards Organization (ISO) 14443 interface. The I$^2$C interface comprises a serial communications bus and protocol for transferring data. The ISO 1443 interface defines transmission protocols for communicating messages through contactless integrated circuit cards, also referred to as proximity cards. Protocol handler firmware 112 may infer the messages received over the I$^2$C interface target one LSE (e.g., LSE #1) and messages received over the contactless interface target a different LSE (e.g., LSE #2). Additionally or alternatively, I/O interfaces 218 may include other forms of I/O interfaces, which may include varying protocols and circuitry, such as other types of contactless integrated circuit cards, wireless communication interfaces, and bus interfaces. For these interfaces, protocol handler firmware 112 may similarly infer which LSE to activate based on the I/O interface through which the message is received.

Additionally or alternatively, protocol handler firmware 112 may deduce the targeted LSE based on information from other protocol layers. Example layers may include the physical layer, the data link layer, the transport layer, the session layer, and/or the application layer. For instance, protocol handler firmware 112 may infer the targeted LSE based on the physical link over which the message was received, the protocol used to transfer data frames between the host and the SE hardware platform, an open session associated with the message, the applet invoked by the message, and/or the contents of the message.

In operation 406, protocol handler firmware 112 parses LSE mapping table 206 and accesses the mapping table entry for the LSE targeted by the message. For example, protocol handler firmware 112 may scan the table to identify table entry 208a if LSE 108a is targeted by the message or table entry 208n if LSE 108n is targeted. Protocol handler firmware 122 may read or otherwise access the LSE identification data, global data registry, and the LSE keys for the targeted LSE.

In operation 408, protocol handler firmware 112 may perform access verification of the message. If the message is not successfully verified, then protocol handler firmware 112 may terminate the process and block the switch operation from completing. Thus, the message targeted by the LSE is not activated. Otherwise, the switch operation may proceed. Techniques for verifying messages are described further below in Section 6, titled Access Control: Message Verification, and Section 7, titled Access Control: Use-Based Restrictions. In other embodiments, message processing may continue without implementing access controls.

In operation 410, protocol handler firmware 112 reassigns a global address in switch memory area 204 to the address of the mapping table entry for the targeted LSE. The address for the previously activated LSE may be overwritten with the new address. In some embodiments, write access to reassign the global address in switch memory area 204 is exclusive to protocol handler firmware 112. For example, exclusivity may be enforced by using a memory protection unit (MPU) if available on the SE hardware platform. An MPU is a hardware component that protects memory regions by restricting access to authorized entities. The MPU may be part of SE processor 104 or a separate unit. The MPU may be configured to monitor write transactions targeting switch memory area 204 and trigger a fault exception when the write access does not originate from protocol handler firmware 112.

Additionally or alternatively, write access may be restricted by enforcing a cryptographic signature between protocol handler firmware 112. Protocol handler firmware 112 may sign data written to switch memory area 204 using a private key. SESS-code 202 may then verify the signature of the switch memory area data using the corresponding public key. If the signature is not able to be successfully verified, then the attempted write to change the global address may be blocked.

In operation 412, protocol handler firmware 112 forwards the message to SESS-code 202 for further processing. In some embodiments, SESS-code 202 dereferences the global data structure in the table entry pointed to by the memory address stored in switch memory 202. SESS code 202 may then access the global structures and memory segments bound to the requested LSE to process the request. For example, SESS-code 202 may access the internal registries and states associated with the targeted LSE including personalization data, memory management data, and application management data. Based on the SESS-data mapped to the LSE, SESS-code 202 may run one or more LSE applets to process and respond to the message.

5. Isolation Enforcement

In some embodiments, the SE hardware platform enforces confidentiality and integrity isolation between LSEs 108a-n. For example, protocol handler firmware 112 and/or SESS-code 202 may prevent an LSE from determining what other LSEs are running on the same SE hardware platform including which SSPs are associated with the other LSEs and what other applications are currently being hosted. Protocol handler firmware 112 and/or SESS code 202 may further prevent an LSE from accessing memory segments or operating on data bound to another LSE.

In some embodiments, protocol handler firmware 112 derives a set of keys for each LSE to enforce confidentiality and integrity isolation. SESS-code 202 may use the LSE keys to enforce the protection of sensitive secrets. For instance, cryptographic keys may be used by SE applications to guard against hardware attacks such as by seeding random number generators and initializing keys for a global platform issuer security domain (ISD). Additionally or alternatively, the SE hardware platform may require keys to share memories with an external entity.

With integrated SE chipsets, the RAM and NVM memories of the SE may be shared with the System on Chip (SoC) on which the SE is integrated. In this case, the isolation of the shared memories between the SE and the SoC may be performed by cryptographic operations that verify the authenticity and integrity of the data accessed by the SE. SESS-code 202 may manage the cryptographic operations and may use a hardware-based mechanism during access operations. Having a unique set of keys per LSE allows SESS-code 202 to additionally enforce and verify the isolation of data between LSEs.

Figure 5:
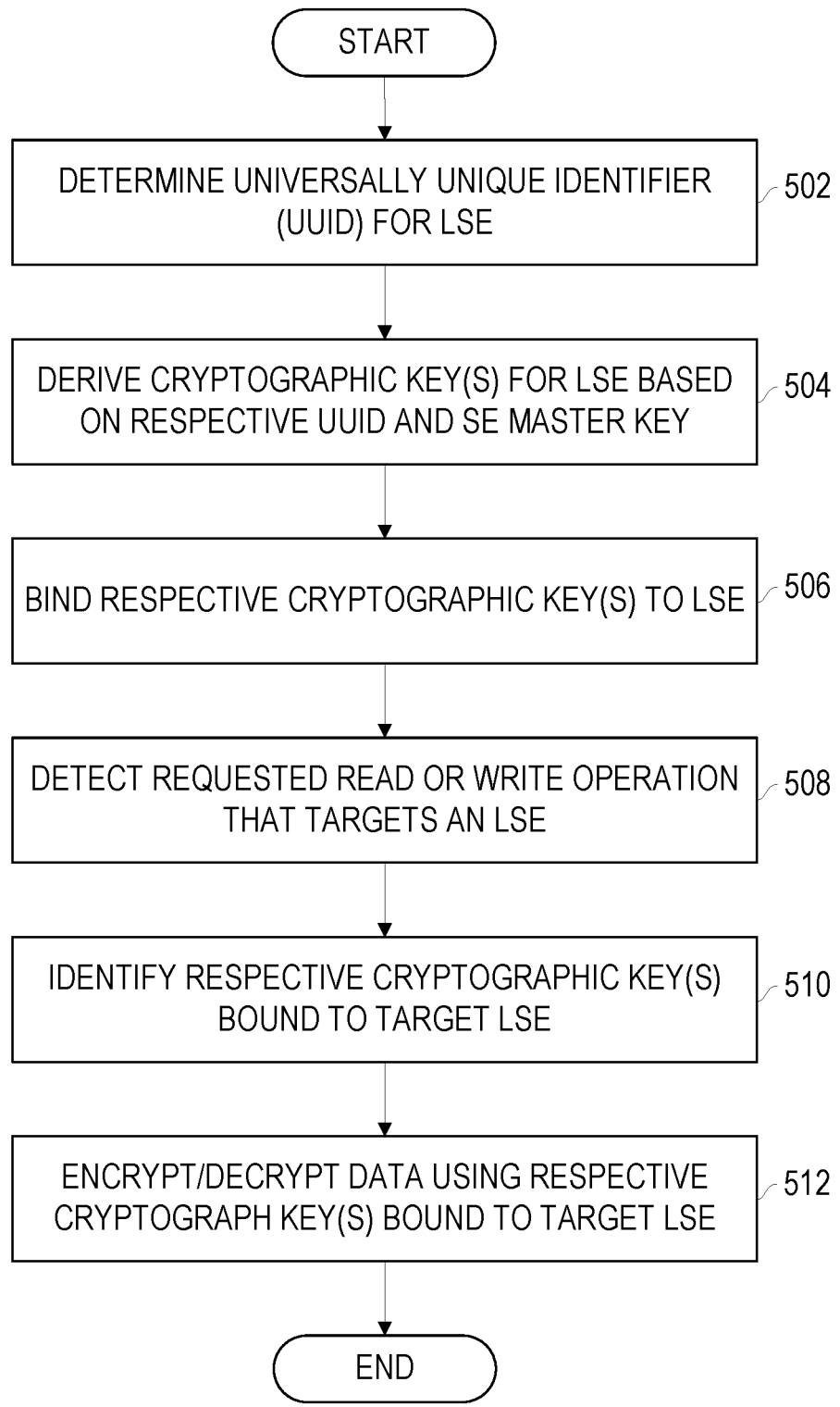
FIG. 5 illustrates a set of operations for deriving and applying keys to enforce isolation between LSEs in accordance with some embodiments.

FIG. 5 illustrates a set of operations for deriving and applying keys to enforce isolation between LSEs in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

Referring to FIG. 5, in operation 502, protocol handler firmware 112 determines a UUID for a target LSE. As previously noted, the UUID value is a globally unique identifier, which may be generated as a function of one or more factors associated with the LSE, such that LSE #n does not have the same value on different devices.

In operation 504, protocol handler firmware 112 derives one or more cryptographic keys for the LSE based on the respective UUID and an SE master key. The SE master key may be a cryptographic key that is unique to and stored by the SE hardware. The SE master key may be used to encrypt the LSE keys. In some embodiments, protocol handler firmware 112 applies a secure hash algorithm (e.g., SHA-256) to a combination of the SE master key and the UUID to derive one or more cryptographic keys for the LSE. However, the algorithm for deriving the unique keys for an LSE may vary depending on the particular implementation. For instance, protocol handler firmware 112 may apply the secure hash algorithm to other combinations of values, which may include the table entry index for the LSE and/or other LSE attributes. Additionally or alternatively, protocol handler firmware 112 may apply other cryptographic hash algorithms to derive the LSE keys.

In operation 506, protocol handler firmware 112 binds the one or more cryptographic keys to the LSE. Protocol handler firmware 112 may verify that keys are unique per LSE and store the keys, or a reference to the keys, in an entry of LSE mapping table 206 that is linked to the LSE.

In operation 508, SESS-code 202 detects a read or write operation that targets an LSE. For example, the operation may request to read a memory segment bound to a given LSE or to store sensitive data on the LSE.

In operation 510, SESS-code 202 identifies the one or more cryptographic keys that have been bound to the target LSE. For example, SESS-code 202 may parse the table entry for the currently activated LSE using the address stored in switch memory area 204. SESS-code 202 may fetch the LSE keys from the entry, if stored therein, or dereference a pointer to access the keys.

In operation 512, SESS-code 202 encrypts and/or decrypts data using the one or more cryptographic keys bound to the target LSE. In some embodiments, SESS-code 202 may use HW-based cryptography module 106 to encrypt and/or decrypt data using the keys. For example, SESS-code 202 may provide the keys to a cryptographic accelerator to encrypt data written to a memory segment bound to the LSE or to decrypt data read from the memory segment.

In some embodiments, LSE keys may be refreshed periodically or responsive to receiving certain messages. For example, protocol handler firmware 112 may generate and derive the keys for a target LSE during a switch operation to activate the LSE. In this scenario, protocol handler firmware 112 may derive the keys between operation 406 and 410 as illustrated in FIG. 4. Thus, the switch operation may comprise generating/refreshing LSE keys and writing the keys to a memory segment referenced by a pointer in the mapping table entry for the LSE.

In some embodiments, SESS-code 202 may use the keys to protect memory regions that are bound to an LSE. For example, if an operation attempts to read or write to a memory segment that is bound to one LSE using the LSE keys bound to another LSE, then SESS-code 202 may deny the operation. Thus, an LSE may be prevented from not only decrypting sensitive data but also accessing memory segments where the encrypted data is stored within SE memory 116.

6. Access Control: Message Verification

In some embodiments, access control is applied to messages to prevent unauthorized entities from triggering switch operations and accessing LSE resources. Access control operations may use a public key or shared secret that is stored in LSE mapping table 206. In some embodiments, each LSE may be assigned a unique public key. In other embodiments, a public key may be shared by all or a subset of LSEs.

In some embodiments, the keys used for access control are distinct from the LSE keys used to protect memories and encrypt/decrypt SSE data for an LSE. For example, LSE mapping table 206 may include different fields for the distinct sets of keys. A first field may store or reference a set of one or more cryptographic keys used for encryption operations. The cryptographic keys may be unique to the LSE to enforce isolation and data integrity as previously discussed. A second field may store or reference the public key or shared secret used for access control. The access control key may be unique to the LSE or shared by multiple LSEs.

Figure 6:
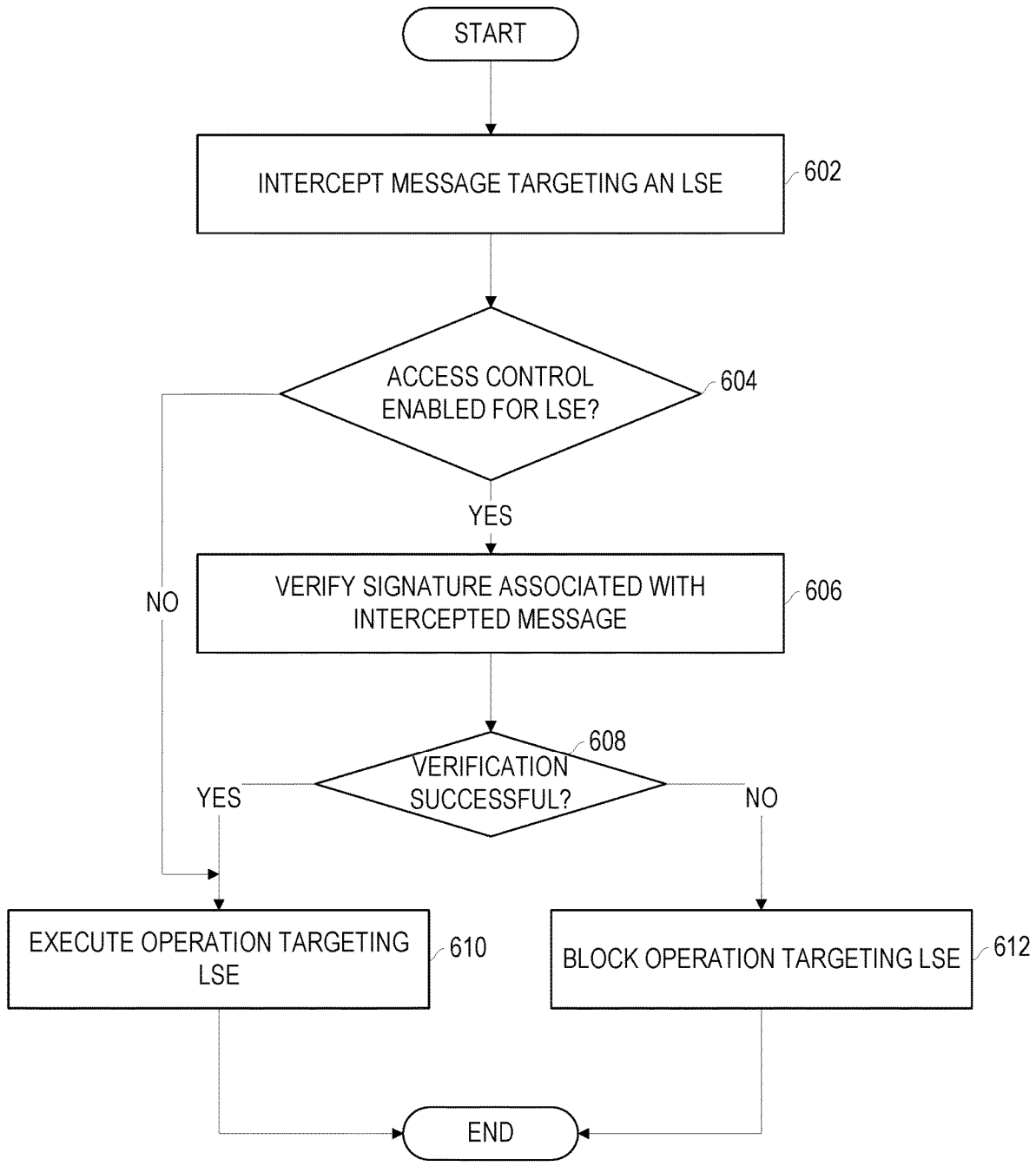
FIG. 6 illustrates an example set of operations for controlling access to an LSE in accordance with some embodiments.

FIG. 6 illustrates an example set of operations for controlling access to an LSE in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments. As previously noted, access control operations may be performed during a switch operation, such as in operation 408 illustrated in FIG. 4. Additionally or alternatively, access control operations may be applied to other messages targeting an LSE.

In operation 602, protocol handler firmware 112 intercepts a message targeting an LSE. Protocol handler firmware 112 may deduce the LSE that is targeted based on the I/O interface through which the message was intercepted, information encoded in the messages, and/or information from other protocol layers as previously described.

In operation 604, protocol handler firmware 112 determines whether access control is enabled for the LSE. In some embodiments, protocol handler firmware 112 may parse the LSE's entry in mapping table 206 to determine whether there is an access control key (e.g., a public key or shared secret) stored or referenced by the corresponding field. If no keys or references are stored, then protocol handler firmware 112 may infer that access control for the target LSE is not enabled.

In other embodiments, access control keys for an LSE and/or references thereto may be stored in other areas of memory, such as a segment dedicated for access control keys and/or policies. Protocol handler firmware 112 may scan or otherwise search for access control keys in the dedicated region of memory. If no keys or references are stored, then protocol handler firmware 112 may infer that access control for the target LSE is not enabled.

In other embodiments, protocol handler firmware 112 may check an access control policy to determine whether access control has been enabled for an LSE. An access control policy may enable or disable access controls at the individual level of an LSE, for groups of LSEs, or on a global basis for all LSEs running on a SE hardware platform. With respect to groups of LSEs, access control policies may enable access controls based on attributes that are common to a group of LSEs, such as for all LSEs from the same SSP or all LSEs of a particular type (e.g., all virtual SIM cards). As another example, an access control policy may be applied based on the I/O interface through which the message was received. For instance, access control verification may be applied to all messages received from NFC controller 134 but skipped if received from host processor 140.

Additionally or alternatively, groups of LSEs may be mapped to the same access control key. For example, all LSEs from the same SSP or of the same type may refer to the same public key field by referencing the address of the LSE entry or memory area where the public key is stored. In other embodiments, all LSEs running on an SE hardware platform may refer to the same public key. In this scenario, access control module 114 may act as owner of the key.

If access control is enabled, then, in operation 606, access control module 114 verifies the signature associated with the intercepted message. For example, the signature of the message may include a digital certificate, issued by a third-party certificate authority, that is encrypted using a private key, where the private key is owned by an authorized entity and pairs with the public key mapped to the target LSE. Access control module 114 may decrypt the signature using the public key.

If access control module 114 is able to successfully decrypt the certificate, and the certificate verifies the owner of the private key's identify, then, in operation 608, access control module 114 determines that the signature is successfully verified. If decryption is unsuccessful or the message includes an invalid certificate, then the verification process also fails.

In other embodiments, access control module 114 may use other access verification protocols to verify a signature. For example, access control module 114 may verify that the signature was generated using a shared secret, such as pre-shared key (PSK). If access control module 114 is not able to decrypt the signature using the PSK, then verification may fail.

As another example, the public key field in the LSE's mapping table entry may be a certificate to validate a chain of certificates and check against a sub-certification authority in addition to the signature of the message. To validate the chain, access control module 114 may start at an anchor point in the chain and verify the signature of the next certificate using a public key associated with the current certificate, continuing down the chain and verifying each link until reaching the end. Verification may succeed if the chain is validated and fail otherwise.

In yet another example, the public key field in the LSE's mapping table entry may store or reference a digest of the public key and/or certificate. For instance, a digest may be generated by applying a secure hash algorithm (e.g., SHA-256) to the public key and certificate. The digest may reduce the storage overhead of the access control key.

If verification is successful or access control is not enabled, then, in operation 610, the operation targeting the LSE is executed. For example, protocol handler firmware 112 may execute operation 410 and 412, as illustrated in FIG. 4, to complete a switch operation. In other embodiments, protocol handler firmware 112 may forward the message to SESS-code 202 without performing a switch if the LSE is currently activated.

If the verification is unsuccessful, then, in operation 612, protocol handler firmware 112 blocks the operation targeting the LSE. For example, protocol handler firmware 112 may block a switch operation from occurring by preventing reassignment of the global address for the LSE within switch memory area 204. Thus, the target LSE is not activated. Additionally or alternatively, protocol handler firmware 112 may delete the message without forwarding the message to SESS-code 202. In cases where the targeted LSE is already active, dropping the message may prevent the message from triggering other operations that access the SESS-data bound to the LSE.

7. Access Control: Use-Based Restrictions

In some embodiments, an access control policy may define resource and other use-based restrictions to control access to an LSE. Use-based restrictions may prevent an LSE from monopolizing or unduly burdening the shared hardware resources of an SE. Use-based restrictions may further prioritize access rights when multiple LSEs are running applications on the shared SE hardware platform.

In some embodiments, an access policy may be exposed to and configured by an end user, such as through a graphical user interface (GUI) on mobile device 100. The user may select configuration options through the GUI, such as priority levels associated with different LSEs, resource restrictions, and/or other parameters for controlling access as discussed further herein.

In some embodiments, an access policy may define time-based restrictions on one or more LSEs. For example, an access policy may specify a maximum threshold time that an LSE may be active within a moving window of time. If the LSE remains active longer than the maximum threshold time within the moving window, then access control module 114 may temporarily restrict access to the SE hardware for a duration of time.

In some embodiments, an access policy may define switch frequency restrictions for one or more LSEs. For example, an access policy may specify a maximum number of times an LSE may be activated through a switch operation within a moving window of time. If the number of activations for the LSE within the time window exceeds the threshold, then access control module 114 may temporarily restrict access to the SE hardware for a duration of time.

In some embodiments, an access policy may define resource consumption thresholds for one or more LSEs. For example, an access policy may specify a maximum processor or memory utilization rate to restrict the consumption of SE hardware resources by an LSE. If a resource utilization rate exceeds the threshold, then access control module 114 may temporarily restrict access to the SE hardware for a duration of time. As another example, an access policy may specify a maximum threshold utilization of peripherals within the host device. If an operation exceeds the maximum threshold utilization of peripherals, then access control module 114 may block, delay, or halt the operation.

In some embodiments, an access policy may require additional user authentication, such as a user's code or biometric authentication, to perform an operation. For instance, access control module 114 may block a payment operation if the user cannot be successfully authenticated.

In some embodiments, an access policy may define minimum use thresholds to prioritize access for an LSE. For example, an access policy may specify a minimum threshold duration before a switch operation deactivates an LSE. Access control module 114 may block or delay switch operations until the minimum threshold has been satisfied. Additionally or alternatively, determining whether to perform the switch may be based on priority levels associated with the currently activated LSE and the target LSE to activate. If the target LSE has a higher priority level, then protocol handler firmware 112 may perform the switch. Otherwise, protocol handler firmware 112 may block or delay the switch until the currently active LSE has completed message processing.

Access policies may be defined and applied on an individual LSE basis, to groups of LSEs, or to all LSEs. When applied to individual LSEs, the policies and thresholds may vary from one LSE to the next. For example, one LSE may have a higher threshold time duration than another LSE. Similarly, the policies and thresholds may vary between different groups of LSEs. The LSEs may be grouped based on common attributes as previously described. For instance, access control policies may be applied based on LSE type such as a defining an access control policy that is applied to virtual SIM cards, another to payment services, another to identity services, etc. A user may define the grouping criteria or create custom groups through a GUI interface.

Figure 7:
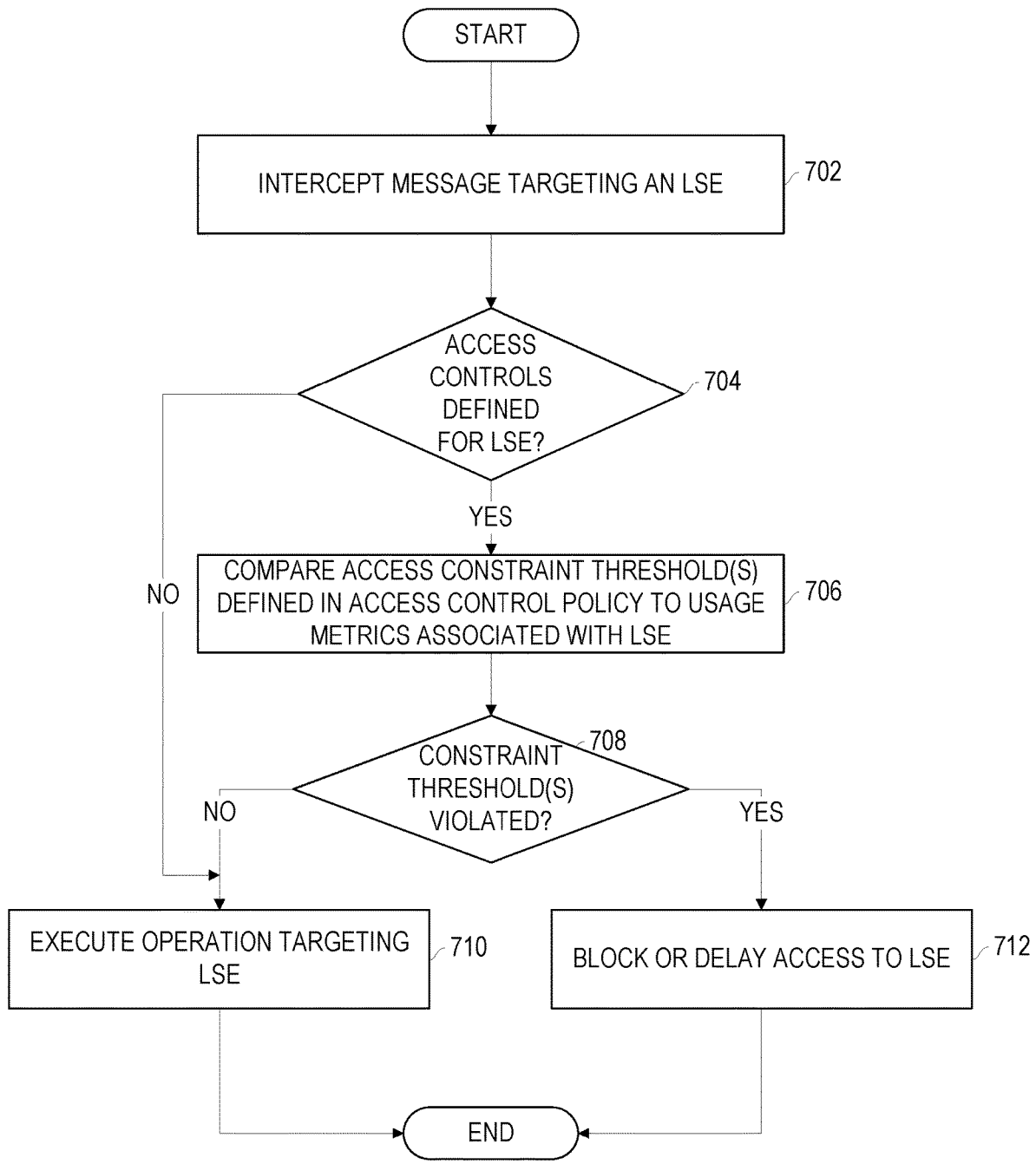
FIG. 7 illustrates an example set of operations for applying access control policies to an LSE according to some embodiments.

FIG. 7 illustrates an example set of operations for applying access control policies to an LSE according to some embodiments. One or more operations illustrated in FIG. 7 may be modified, rearranged, or omitted all together. Accordingly, the particular sequence of operations illustrated in FIG. 7 should not be construed as limiting the scope of one or more embodiments.

In operation 702, protocol handler firmware 112 intercepts a message targeting an LSE. Protocol handler firmware 112 may deduce the LSE that is targeted based on the I/O interface through which the message was intercepted, information encoded in the messages, and/or information from other protocol layers as previously described.

In operation 704, protocol handler firmware 112 determines whether an access policy has defined access controls for the LSE. In some embodiments, protocol handler firmware 112 may parse the LSE's entry in mapping table 206 or search a dedicated region in memory to determine whether there is an access control policy stored or referenced by a corresponding access control field. If no policy is stored or referenced, then protocol handler firmware 112 may infer that access control for the target LSE is not enabled. In other cases, the access control policy may explicitly indicate that there are no access controls defined for the LSE.

If access controls have been defined, then, in operation 706, access control module 114 compares one or more access constraint thresholds defined in the access control policy to one or more usage metrics associated with the LSE. For example, access control module may track and compare active time, number of switches, memory utilization, and/or other metrics with corresponding thresholds.

In operation 708, access control module 114 determines whether one or more of the constraint thresholds have been violated. For example, access control module may determine whether the aggregate active time, switch frequency, or resource utilization rates have exceeded a constraint threshold.

If the constraint threshold(s) have not been exceeded or access controls are not applicable, then, in operation 710, the operation targeting the LSE is executed. For example, protocol handler firmware 112 may execute operation 410 and 412, as illustrated in FIG. 4, to complete a switch operation. In other embodiments, protocol handler firmware 112 may forward the message to SESS-code 202 without performing a switch if the LSE is currently activated.

If one or more of the constraint threshold(s) have been exceeded or otherwise violated, then, in operation 712, protocol handler firmware 112 blocks or delays the operation targeting the LSE. For example, protocol handler firmware 112 may block or delay a switch operation from occurring by preventing reassignment of the global address for the LSE within switch memory area 204 or delaying the reassignment for a threshold time or until an operation of the currently activated LSE is complete. Additionally or alternatively, protocol handler firmware 112 may delete the message without forwarding the message to SESS-code 202 or delay delivery of the message to SESS-code 202.

8. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
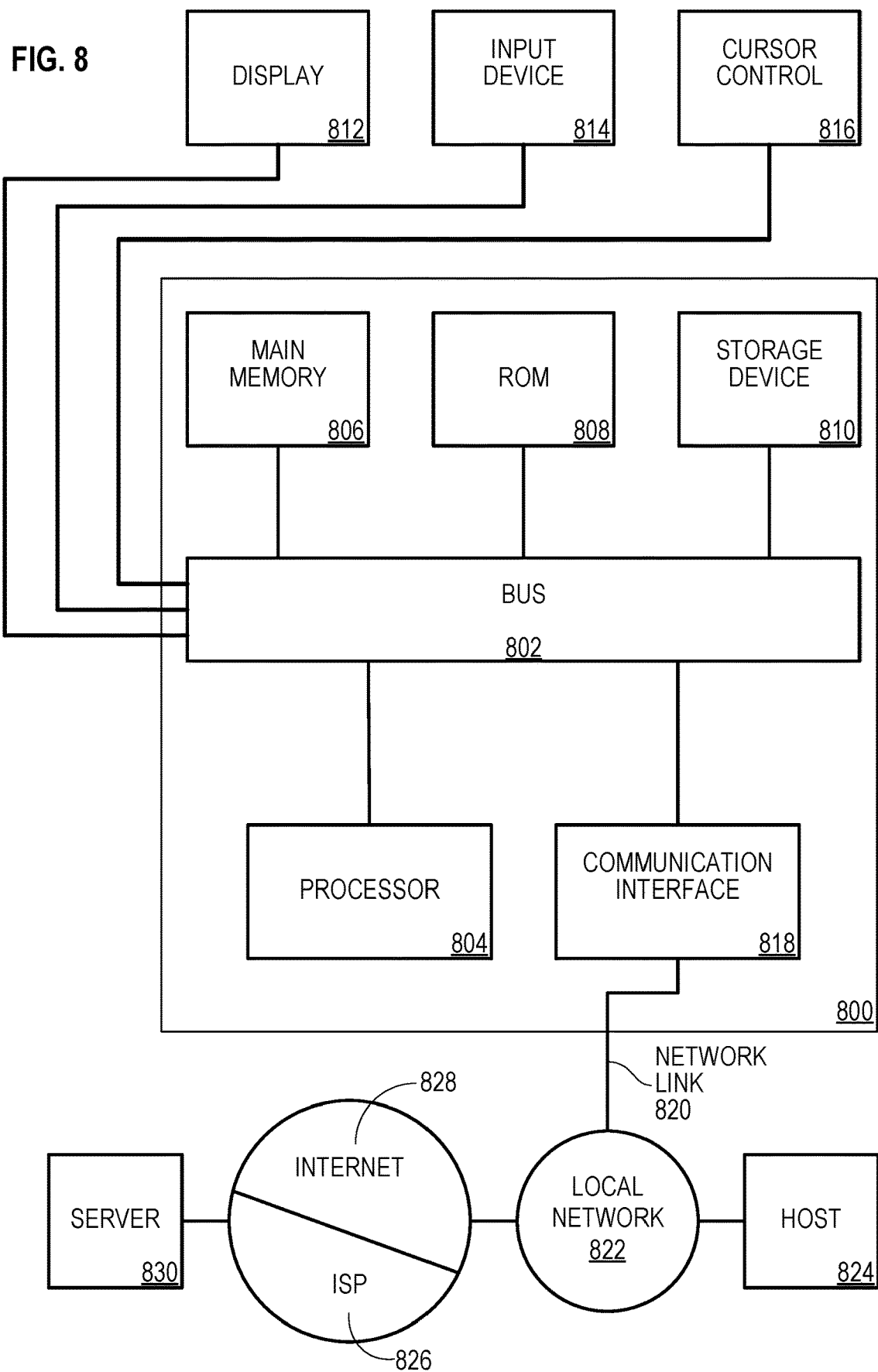
FIG. 8 shows a block diagram that illustrates a computer system in accordance with one or more embodiments.

For example, FIG. 8 is a block diagram that illustrates computer system 800 upon which some embodiments of the invention may be implemented. Computer system 800 includes bus 802 and/or one or more other communication mechanisms for transferring data between system components. Computer system 800 also includes hardware processor 804 coupled with bus 802 for processing information. Hardware processor 804 may be, for example, a general-purpose microprocessor.

Computer system 800 further includes main memory 806, such as random-access memory (RAM) and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 and/or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light-emitting diode (LED) screen, for displaying information to a computer user. Input device 814, including alphanumeric and other keys, is coupled to bus 802 for communicating information and command selections to processor 804. Another type of user input device is cursor control 816, such as a touchscreen, mouse, a trackball, or cursor direction keys for communicating direction information and command selections to processor 804 and for controlling cursor movement on display 812. This input device may have two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes communication interface 818 coupled to bus 802. Communication interface 818 provides a two-way data communication coupling to network link 820 that is connected to local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to host computer 824 or to data equipment operated by Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   receiving a message that targets a particular logical secure element of a plurality of logical secure elements that are hosted by a secure element hardware platform;
   responsive to receiving the message, determining whether to trigger at least one operation targeting the particular logical secure element based on an access control policy associated with the particular logical secure element;
   wherein the access control policy defines at least one of:
      (a) a switch threshold that restricts a frequency of switching between logical secure elements or (b) a resource usage threshold that restricts a utilization rate of hardware resources within the secure element hardware platform for the particular logical secure element; and
   preventing or delaying the at least one operation from triggering responsive to detecting at least one violation of the access control policy.

2. The one or more non-transitory machine-readable media as recited in claim 1, wherein the access control policy defines a time threshold that restricts how long the particular logical secure element may remain active; wherein detecting the at least one violation of the access control policy comprises detecting that the time threshold has been exceeded.

3. The one or more non-transitory machine-readable media as recited in claim 1, wherein detecting the at least one violation of the access control policy comprises detecting that the resource usage threshold has been exceeded.

4. The one or more non-transitory machine-readable media as recited in claim 1, wherein detecting the at least one violation of the access control policy comprises detecting that the switch threshold has been exceeded.

5. The one or more non-transitory machine-readable media as recited in claim 1, wherein the access control policy defines priority levels for the plurality of logical secure elements; wherein preventing or delaying the at least one operation is based, at least in part, on a priority level associated with at least one logical secure element of the plurality of logical secure elements.

6. The one or more non-transitory machine-readable media as recited in claim 1, wherein preventing or delaying the at least one operation from triggering is performed further responsive to detecting a failure to validate the message using an access control key associated with the particular logical secure element.

7. The one or more non-transitory machine-readable media as recited in claim 6, wherein the access control key is a public key that is mapped to the particular logical secure element within a mapping table; wherein the public key is used to validate signature on messages intercepted by firmware running on the secure element hardware platform.

8. The one or more non-transitory machine-readable media as recited in claim 1, wherein the secure element hardware platform is a smart card embedded in a mobile device.

9. A method comprising:
receiving a message that targets a particular logical secure element of a plurality of logical secure elements that are hosted by a secure element hardware platform;
responsive to receiving the message, determining whether to trigger at least one operation targeting the particular logical secure element based on an access control key associated with the particular logical secure element;
wherein the access control key is a public key that is mapped to the particular logical secure element within a mapping table, wherein the public key is used to validate signatures on messages intercepted by firmware running on the secure element hardware platform; and
preventing or delaying the at least one operation from triggering responsive to detecting a failure to validate the message using the access control key.

10. The method as recited in claim 9, wherein preventing or delaying the at least one operation from triggering is performed further responsive to detecting at least one of a violation of an access control policy.

11. The method as recited in claim 10, wherein the access control policy defines a time threshold that restricts how long the particular logical secure element may remain active; wherein detecting the at least one violation of the access control policy comprises detecting that the time threshold has been exceeded.

12. The method as recited in claim 10, wherein the access control policy defines a resource usage threshold that restricts a utilization rate of hardware resources within the secure element hardware platform for the particular logical secure element; wherein detecting the at least one violation of the access control policy comprises detecting that the resource usage threshold has been exceeded.

13. The method as recited in claim 10, wherein the access control policy defines a switch threshold that restricts a frequency of switching between different logical secure elements; wherein detecting the at least one violation of the access control policy comprises detecting that the switch threshold has been exceeded.

14. The method as recited in claim 10, wherein the access control policy defines priority levels for the plurality of logical secure elements; wherein preventing or delaying the at least one operation is based, at least in part, on a priority level associated with at least one logical secure element of the plurality of logical secure elements.

15. The method as recited in claim 9, wherein the firmware identifies the public key based at least in part on the particular logical secure element targeted by the message; wherein the firmware determines which of the plurality of logical secure elements is targeted based at least in part on an interface through which the message is received.

16. The method as recited in claim 9, wherein the secure element hardware platform is a smart card embedded in a mobile device.

17. A method comprising:
receiving a message that targets a particular logical secure element of a plurality of logical secure elements that are hosted by a secure element hardware platform;
responsive to receiving the message, determining whether to trigger at least one operation targeting the particular logical secure element based on an access control policy associated with the particular logical secure element;
wherein the access control policy defines at least one of: (a) a switch threshold that restricts a frequency of switching between logical secure elements or (b) a resource usage threshold that restricts a utilization rate of hardware resources within the secure element hardware platform for the particular logical secure element; and
preventing or delaying the at least one operation from triggering responsive to detecting at least violation of the access control policy.

18. The method as recited in claim 17, wherein the access control policy defines a time threshold that restricts how long the particular logical secure element may remain active; wherein detecting the at least one violation of the access control policy comprises detecting that the time threshold has been exceeded.

19. The method as recited in claim 17, wherein the access control policy defines priority levels for the plurality of logical secure elements; wherein preventing or delaying the at least one operation is based, at least in part, on a priority level associated with at least one logical secure element of the plurality of logical secure elements.

20. The method as recited in claim 17, wherein the secure element hardware platform is a smart card embedded in a mobile device.

21. One or more non-transitory machine-readable media storing instructions which, when executed by one or more processors, cause performance of operations comprising:
receiving a message that targets a particular logical secure element of a plurality of logical secure elements that are hosted by a secure element hardware platform;
responsive to receiving the message, determining whether to trigger at least one operation targeting the particular logical secure element based on an access control key associated with the particular logical secure element;
wherein the access control key is a public key that is mapped to the particular logical secure element within a mapping table, wherein the public key is used to validate signatures on messages intercepted by firmware running on the secure element hardware platform; and
preventing or delaying the at least one operation from triggering responsive to detecting a failure to validate the message using the access control key.

22. A system comprising:
one or more hardware processors;
one or more non-transitory computer-readable media; and
program instructions stored on the one or more non-transitory computer-readable media that, when executed by the one or more hardware processors, cause the system to perform operations comprising:
receiving a message that targets a particular logical secure element of a plurality of logical secure elements that are hosted by a secure element hardware platform;

responsive to receiving the message, determining whether to trigger at least one operation targeting the particular logical secure element based on an access control policy associated with the particular logical secure element;

wherein the access control policy defines at least one of: (a) a switch threshold that restricts a frequency of switching between logical secure elements or (b) a resource usage threshold that restricts a utilization rate of hardware resources within the secure element hardware platform for the particular logical secure element; and preventing or delaying the at least one operation from triggering responsive to detecting at least one violation of the access control policy.

23. A system comprising:

one or more hardware processors;

one or more non-transitory computer-readable media; and program instructions stored on the one or more non-transitory computer-readable media that, when executed by the one or more hardware processors, cause the system to perform operations comprising:

receiving a message that targets a particular logical secure element of a plurality of logical secure elements that are hosted by a secure element hardware platform;

responsive to receiving the message, determining whether to trigger at least one operation targeting the particular logical secure element based on an access control key associated with the particular logical secure element;

wherein the access control key is a public key that is mapped to the particular logical secure element within a mapping table, wherein the public key is used to validate signatures on messages intercepted by firmware running on the secure element hardware platform; and preventing or delaying the at least one operation from triggering responsive to detecting a failure to validate the message using the access control key.

* * * * *